United States Patent
Di Ponio (10) Patent No.: US 6,325,181 B1
(45) Date of Patent: Dec. 4, 2001

(54) PISTON ASSEMBLY FOR USE IN A WHEEL CYLINDER OF A DRUM BRAKE ASSEMBLY

(75) Inventor: Victor M. Di Ponio, Novi, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/364,780

(22) Filed: Jul. 30, 1999

(51) Int. Cl.[7] .................................................. F16D 51/06
(52) U.S. Cl. ........................ 188/72.4; 188/72.5; 188/362
(58) Field of Search .................................. 188/72.4, 362, 188/363, 364, 72.5

(56) References Cited

U.S. PATENT DOCUMENTS

| | | | |
|---|---|---|---|
| 2,060,853 | * | 11/1936 | Carroll .................................. 188/152 |
| 2,109,091 | * | 2/1938 | Press ..................................... 188/106 |
| 2,325,944 | * | 8/1943 | Frank ..................................... 188/78 |
| 3,712,425 | | 1/1973 | Torii et al. . |
| 3,811,538 | | 5/1974 | Farr . |
| 3,838,757 | | 10/1974 | Farr . |
| 4,042,080 | * | 8/1977 | Nelson .................................. 188/361 |
| 4,174,026 | * | 11/1979 | Johannesen ........................... 188/361 |
| 4,203,354 | * | 5/1980 | Cunningham .......................... 92/169 |
| 4,363,387 | | 12/1982 | Roberts . |
| 4,369,863 | * | 1/1983 | Farr et al. ........................ 188/106 A |
| 4,537,293 | * | 8/1985 | Osborne ......................... 188/196 BA |
| 4,572,334 | * | 2/1986 | Villata .................................. 188/71.6 |
| 4,742,897 | | 5/1988 | Hiroshi et al. . |
| 5,080,202 | | 1/1992 | Tristano et al. . |
| 5,246,091 | | 9/1993 | Brooks, Sr. . |
| 5,273,139 | | 12/1993 | Kotarra et al. . |
| 5,400,879 | | 3/1995 | Johannesen . |
| 5,713,435 | * | 2/1998 | Schneider et al. ................... 188/71.6 |
| 6,019,199 | * | 2/2000 | Heidenreich ....................... 188/73.34 |

* cited by examiner

Primary Examiner—Robert J. Oberleitner
Assistant Examiner—Melody M. Burch
(74) Attorney, Agent, or Firm—MacMillan, Sobanski & Todd, LLC (57) ABSTRACT

This invention relates to an improved structure for a wheel cylinder for use in a drum brake assembly having a pair of brake shoes which are adapted to be urged into frictional engagement with a brake drum. The wheel cylinder includes a pair of opposed piston assemblies each having a piston body formed from a plastic material and a piston insert formed from metal. In accordance with one embodiment of this invention, the piston insert is molded in situ with the piston body and the piston insert includes a radially outwardly extending first flange and a radially outwardly extending second flange. The first flange defines a first flange outer diameter, and the second flange defines a second flange outer diameter which is less than the first flange outer diameter. The first flange of the piston insert is operative to distribute the pressure across the associated outer face of the piston body during brake application, and the second flange of the piston insert is operative to assist in securing the piston insert to the piston body during the molding process.

7 Claims, 7 Drawing Sheets

PISTON ASSEMBLY FOR USE IN A WHEEL CYLINDER OF A DRUM BRAKE ASSEMBLY

BACKGROUND OF THE INVENTION

This invention relates in general to vehicle drum brake assemblies and in particular to an improved structure for a piston assembly adapted for use in a wheel cylinder of such a vehicle drum brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A typical drum brake assembly includes a backing plate which is secured to a fixed, non-rotatable component of the vehicle, such as the vehicle axle housing. A pair of opposed arcuate brake shoes are supported on the backing plate for selective movement relative thereto. Each of the brake shoes has a friction pad secured thereto. The drum brake assembly further includes a cylindrical brake drum which is secured to the vehicle wheel for rotation therewith. The interior of the brake drum is hollow, defining an inner cylindrical braking surface. The brake drum is disposed adjacent to the backing plate such that the brake shoes extend within the inner cylindrical braking surface. To effect braking action, the brake shoes are moved outwardly apart from one another such that the friction pads frictionally engage the inner cylindrical braking surface of the brake drum. Such frictional engagement causes slowing or stopping of the rotational movement of the brake drum and, therefore, the wheel of the vehicle in a controlled manner.

One or more actuating mechanisms are provided in the drum brake assembly for selectively moving the brake shoes outwardly apart from one another into frictional engagement with the cylindrical braking surface of the brake drum. Usually, a hydraulically or pneumatically actuated service brake mechanism is provided for selectively actuating the drum brake assembly under normal operating conditions. Such a service brake mechanism can include a hydraulically actuated wheel cylinder having a pair of opposed pistons which abut and move the brake shoes apart from one another into frictional engagement with the cylindrical braking surface of the brake drum.

A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the cylindrical braking surface of the brake drum.

SUMMARY OF THE INVENTION

This invention relates to an improved structure for a piston assembly adapted for use in a wheel cylinder of drum brake assembly having a pair of brake shoes which are adapted to be urged into frictional engagement with a brake drum. The piston assembly includes a piston body formed from a plastic material and a piston insert formed from metal. In accordance with one embodiment of this invention, the piston insert is molded in situ with the piston body and the piston insert includes a radially outwardly extending first flange and a radially outwardly extending second flange. The first flange defines a first flange outer diameter, and the second flange defines a second flange outer diameter which is less than the first flange outer diameter. The first flange of the piston insert is operative to distribute the pressure across the associated outer face of the piston body during brake application, and the second flange of the piston insert is operative to assist in securing the piston insert to the piston body during the molding process.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
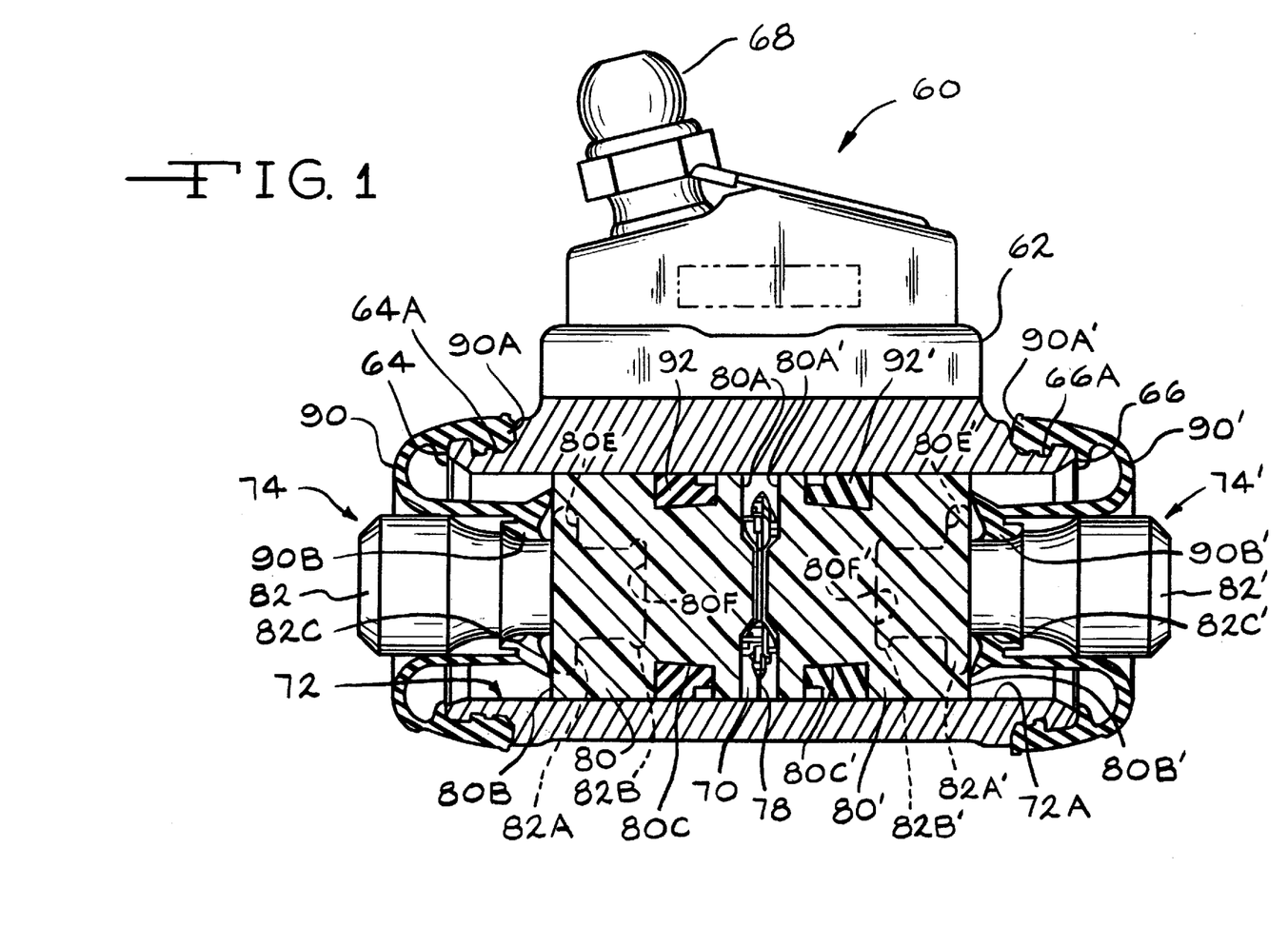
FIG. 1 is a partial sectional view of a wheel cylinder including a first embodiment of a piston assembly adapted for use the wheel cylinder in accordance with this invention.
Figure 12:
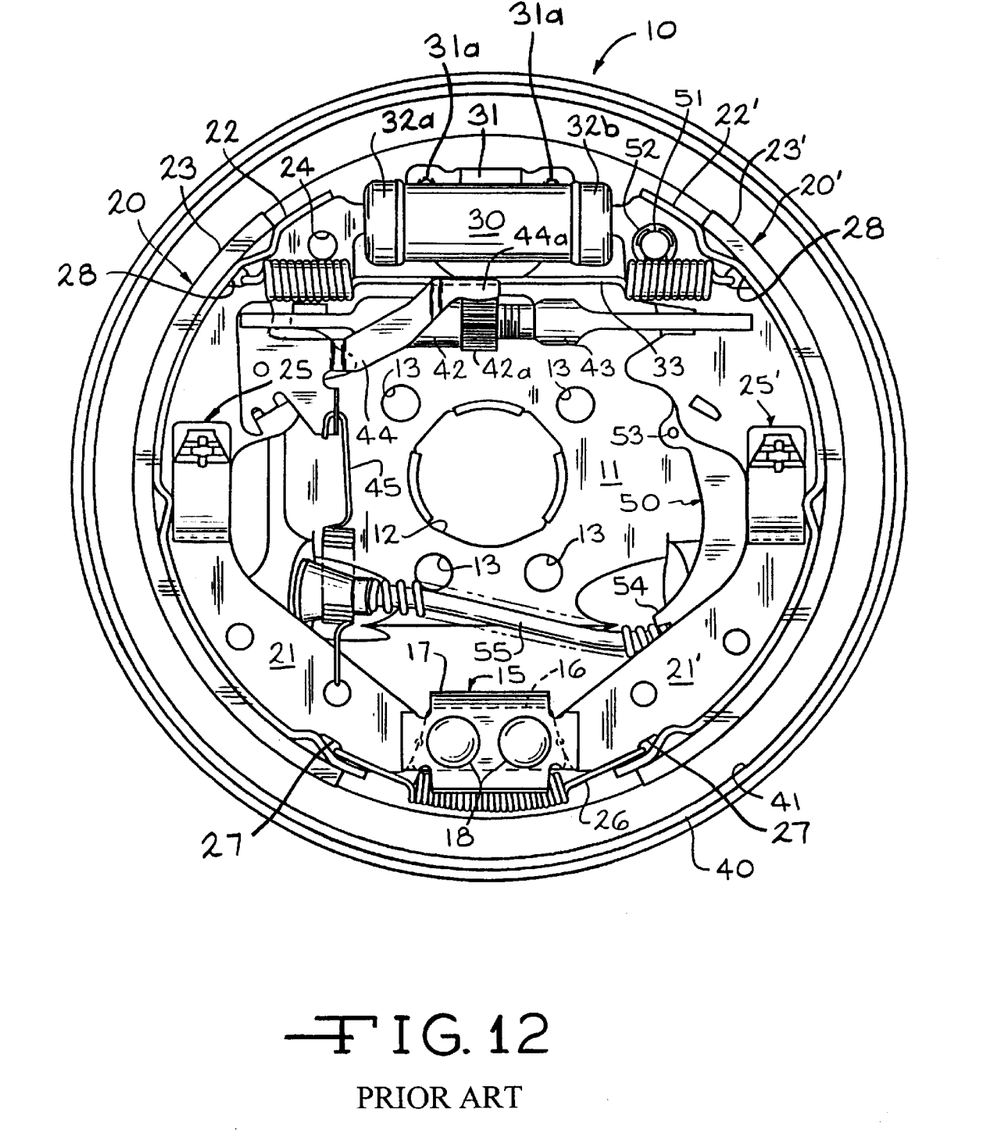
FIG. 12 is a side elevational view of a portion of a prior art drum brake assembly.

Referring now to the drawings, there is illustrated in FIG. 1 partial sectional view of a wheel cylinder, indicated generally at 60, including a first embodiment of a pair of opposed piston assemblies 74, 74', adapted for use with the wheel cylinder 60 in accordance with this invention. The wheel cylinder 60 is adapted to be used in a drum brake assembly, such as that shown in prior art FIG. 12. The general structure and operation of the prior art drum brake assembly, indicated generally at 10 in FIG. 12, is conventional in the art. Thus, only those portions of the prior art drum brake assembly 10 which are necessary for a full understanding of this invention will be explained and illustrated in detail. Although this invention will be described and illustrated in connection with the particular prior art vehicle drum brake assembly disclosed in FIG. 12, it will be appreciated that this invention may be used in connection with other types of wheel cylinders and/or other drum brake assemblies.

The illustrated prior art drum brake assembly 10 includes a rigid backing plate 11 which is generally flat and circular in shape. The backing plate 11 is adapted to be secured to a fixed, non-rotatable component of the vehicle, such as an outer end of a housing (not shown) for enclosing a rotatable axle. To accomplish this, a relatively large opening 12 is formed through a central portion of the backing plate 11. The central opening 12 is provided to permit the outer end of the rotatable axle to extend therethrough to the driven vehicle wheel (not shown). A plurality of relatively small holes 13 are also formed through the backing plate 11, located about the central opening 12. The small holes 13 are provided to permit threaded bolts (not shown) to extend therethrough to secure the backing plate 11 to the outer end of the axle housing.

An abutment block assembly, indicated generally at 15, is provided on an outer surface of the backing plate 11. The abutment block assembly 15 includes an inner spacer plate 16, which is disposed adjacent to the outer surface of the backing plate 11, and an outer retainer plate 17, which is disposed adjacent to the spacer plate 16. The spacer plate 16 and the retainer plate 17 are secured to the backing plate 11 by a pair of rivets 18 or similar fasteners which extend therethrough to the inner surface of the backing plate 11.

The prior art drum brake assembly 10 further includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the opposed outer curved surfaces of the web portions 21 and 21', such as by welding. A friction pad 23 is secured to the outer arcuate surface of the table portion 22 of the brake pad 20, while a friction pad 23' is secured to the outer arcuate surface of the table portion 22' of the brake pad 20'. A circular aperture 24 is formed through the upper end of the web portion 21 of the brake shoe 20 and through the upper end of the web portion 21' of the brake shoe 20'.

The first and second brake shoes 20 and 20' are supported on the backing plate 11 by respective pivot pin and spring-clip assemblies, indicated generally at 25 and 25', which are conventional in the art. As shown by the dotted lines in FIG. 1, the lower ends of the web portions 21 and 21' of the brake shoes 20 and 20', respectively, are slightly curved. The curved lower ends of the web portions 21 and 21' are received between the backing plate 11 and the retainer plate 17 and extend into abutment with the opposed side surfaces of the spacer plate 16. A first coiled spring 26 has hooked ends which extend through respective openings 27 formed through the lower ends of the web portions 21 and 21' so as to urge such lower ends thereof into abutment with the opposed side surfaces of the spacer plate 16.

The prior art drum brake assembly 10 includes a service brake mechanism for actuating the drum brake assembly 10 under normal operating conditions. The service brake mechanism includes a hydraulically actuated wheel cylinder 30 which is disposed between the upper ends of the web portions 21 and 21' of the brake shoes 20 and 20', respectively. The wheel cylinder 30 includes a mounting plate 31 having a pair of threaded openings 31a formed therein. A pair of bolts (not shown) extend through a pair of openings (not shown) provided in the backing plate 11 and threaded ends thereof are received in the threaded openings of the mounting plate 31 to secure the wheel cylinder 30 to the backing plate 11.

The wheel cylinder 30 includes a pair of opposed piston assemblies 32a and 32b which respectively abut the upper ends of the web portions 21 and 21' of the brake shoes 20 and 20'. A second coiled spring 33 has hooked ends which extend through respective openings 28 formed through the upper ends of the web portions 21 and 21' of the brake shoes 20 and 20', respectively, so as to urge such upper ends thereof into abutment with the pistons 32a and 32b. The wheel cylinder 30 is connected to a conventional source of pressurized hydraulic or pneumatic fluid (not shown) for operating the prior art drum brake assembly 10 under normal operating conditions.

The prior art drum brake assembly 10 further includes a hollow cylindrical brake drum 40 which is secured to a wheel (not shown) of the vehicle for rotation therewith. The interior of the brake drum 40 defines a cylindrical braking surface 41. When installed, the brake drum 40 is disposed adjacent to the backing plate 11 such that the brake shoes 20 and 20' extend within the cylindrical braking surface 41. To effect braking action, the brake shoes 20 and 20' are moved outwardly apart from one another so as to frictionally engage the cylindrical braking surface 41 of the brake drum 40. Such frictional engagement causes slowing or stopping of the rotational movement of the brake drum 40 and, therefore, the wheel of the vehicle in a controlled manner.

The hydraulically actuated wheel cylinder 30 is used to operate the drum brake assembly 10 under normal service conditions. When it is desired to actuate the drum brake assembly 10, pressurized hydraulic or pneumatic fluid is supplied to the wheel cylinder 30. Typically, this is accomplished by the operator of the vehicle depressing the brake pedal in the driver compartment of the vehicle. When such pressurized hydraulic or pneumatic fluid is supplied to the wheel cylinder 30, the pistons 32a and 32b are moved apart from one another. As a result, the upper ends of the brake shoes 20 and 20' are also moved apart from one another, essentially pivoting about the abutment block assembly 15. This movement causes the friction pads 23 and 23' of the brake shoes 20 and 20', respectively, to move into frictional engagement with the cylindrical braking surface 41 of the brake drum 40. The abutment block assembly 15 functions to transfer the braking torque from the leading brake shoe (i.e., the left brake shoe 20 when the brake drum 40 is rotating in a counter-clockwise direction) to the frame of the vehicle. When the brake shoes 20 and 20' are moved apart from one another, the second coiled spring 33 is expanded. Thus, when the pressurized hydraulic or pneumatic fluid to the hydraulic actuator 30 is subsequently released, the second coiled spring 33 retracts the brake shoes 20 and 20' inwardly toward one another and out of frictional engagement with the cylindrical braking surface 41 of the brake drum 40.

The prior art drum brake assembly 10 also includes an automatic adjusting mechanism to compensate for thinning of the friction pads 23 and 23' of the brake shoes 20 and 20', respectively, resulting from wear caused by repeated use. The illustrated automatic adjusting mechanism is conventional in the art and includes a pair of struts 42 and 43 having opposed slotted ends. The upper ends of the web portions 21 and 21' of the brake shoes 20 and 20', respectively, are received within the slotted ends of the struts 42 and 43. A star wheel portion 42a is threaded onto the strut 42. An adjuster lever 44 is pivotally mounted on the web portion 21 of the brake shoe 20. The adjuster lever 44 has a protruding arm portion 44a which extends into cooperation with the star wheel portion 42a of the strut 42. A third coiled spring 45 has hooked ends which extend through respective openings formed through the adjuster lever 44 and the lower end of the web portion 21 so as to urge the protruding arm portion 44a of the adjuster lever 44 into engagement with the star wheel portion 42a of the strut 42.

As is known, when the brake shoes 20 and 20' are moved outwardly apart from one another such that the friction pads 23 and 23', respectively, frictionally engage the cylindrical braking surface 41 of the brake drum 40, the adjusting lever 44 is pivoted. When a sufficient amount of wear has occurred on the friction pads 23 and 23', the adjusting lever 44 will be pivoted a sufficient amount so as to rotate the star wheel portion 42a relative to the struts 42 and 43. Such relative rotation causes the opposed ends of the struts 42 and 43 to be moved slightly farther apart from one another, together with the associated upper ends of the brake shoes 20 and 20'. Thus, the automatic adjusting mechanism functions to maintain a predetermined clearance between the friction pads 23 and 23' of the brake shoes 20 and 20', respectively, and the cylindrical braking surface 41 of the brake drum 40 as wear occurs during operation of the prior art drum brake assembly 10.

In addition to the service brake mechanism described above, the prior art drum brake assembly 10 further includes a mechanically actuated parking and emergency brake mechanism. The parking and emergency brake mechanism includes an actuating lever, indicated generally at 50. The actuating lever 50 is pivotally supported on the web 21' of brake shoe 20' by a pivot pin assembly which includes a pivot pin 51 having an enlarged head and a reduced diameter body. The body of the pivot pin 51 is inserted through respective aligned apertures formed through the actuating lever 50 and the web portion 21' of the brake shoe 20'. An E-clip 52 is installed in a groove formed about the end of the body of the pivot pin 51 to retain it in the apertures such that the actuating lever 50 is pivotally supported on the brake shoe 20'.

The actuating lever 50 further includes an upstanding pin 53, and a hooked lower end portion 54. The hooked end portion 54 facilitates the connection of one end of an actuating cable 55 thereto. The actuating cable 55 is conventional in the art and is connected to a hand operated lever (not shown) or similar manually operable parking and emergency brake mechanism for selectively actuating the drum brake assembly 10. The construction of the prior art drum brake assembly 10 thus far described is conventional in the art.

Figure 2:
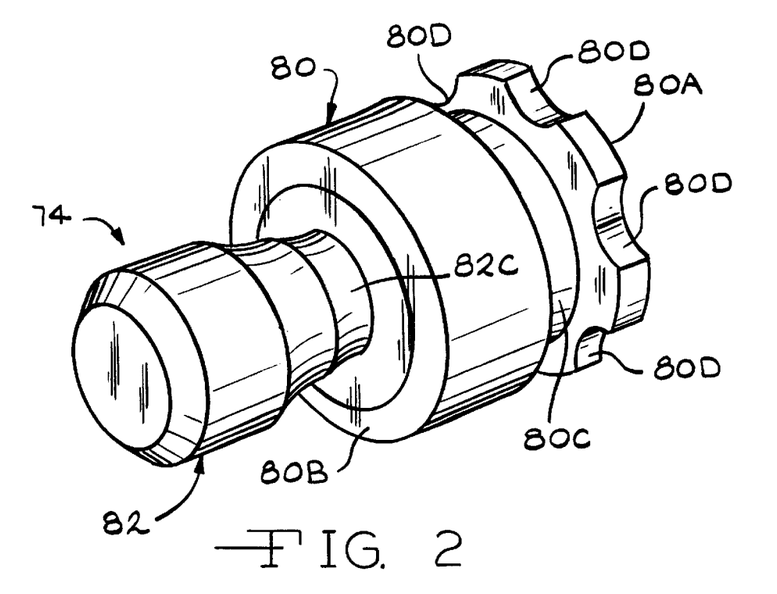
FIG. 2 is a perspective view of a portion of the first embodiment of the piston assembly used in the wheel cylinder illustrated in FIG. 1.
Figure 3:
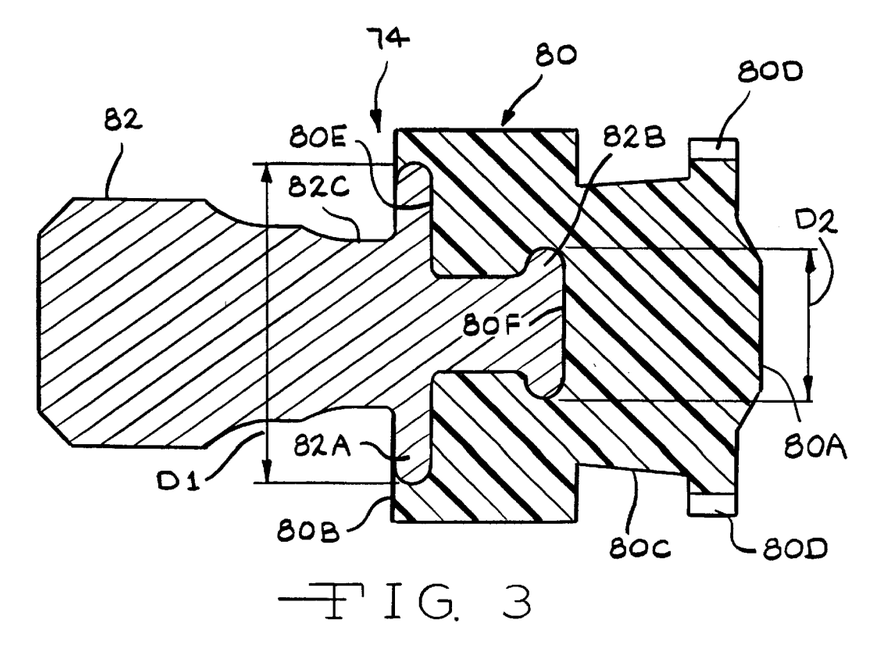
FIG. 3 is a sectional view of the piston assembly illustrated in FIGS. 1 and 2.

Turning now to FIGS. 1–3, the structure of the first embodiment of the piston assemblies 74 and 74' adapted for use in the wheel cylinder 60 in accordance with this invention will be discussed. As shown therein, the wheel cylinder 60 includes the pair of opposed piston assemblies 74 and 74' having a spring 78 interposed therebetween. In the illustrated embodiment, the piston assemblies 74 and 74' are identical to one another. Alternatively, the piston assemblies 74 and 74' can be different from one another if desired.

The wheel cylinder 60 includes a generally cylindrical body or housing 62. The body 62 can be formed from any suitable material, such as for example, metal and plastic. The body 62 of the wheel cylinder 60 includes a first annular groove 64A formed therein adjacent a first opened end 64 thereof, and a second annular groove 66A formed therein adjacent an opposite second opened end 66 thereof. The body 62 further includes a threaded opening (not shown) formed therein for receiving a threaded fitting (not shown). As is known, the fitting is adapted to supply pressurized fluid to a fluid chamber 70 of the wheel cylinder 60. The body 62 may also include an opening (not shown) formed therein for receiving a bleeder screw 68. The body 62 of the wheel cylinder 60 further includes an inner surface 72 which defines a generally cylindrical bore 72A extending through the body 62 between the opposed ends 64 and 66 thereof. The bore 72A of the body 62 of the wheel cylinder 60 defines a generally smooth sliding inner surface for a purpose to be discussed below.

The piston assembly 74 is a composite piston assembly and includes a piston body 80 formed from a first material, and a piston insert 82 formed from a second material. Preferably, the piston body 80 is molded from a plastic and more preferably, the piston body 80 is molded from a synthetic resin material, such as a phenolic resin. Preferably, the piston insert 82 is formed from a metal, such as for example, steel, aluminum or titanium, and is integrally molded in situ therewith, as shown in FIGS. 1–3.

Similarly, the piston assembly 74' is a composite piston assembly and includes a piston body 80' formed from a first material, and a piston insert 82' formed from a second material. Preferably, the piston body 80' is molded from a plastic and more preferably, the piston body 80' is molded from a synthetic resin material, such as a phenolic resin. Preferably, the piston insert 82' is formed from a metal, such as for example, steel, aluminum or titanium, and is integrally molded in situ therewith, as shown in FIGS. 1–3.

The piston body 80 is generally cylindrical and includes an inner face 80A, an outer face 80B, and an annular seal groove 80C formed therein. As best shown in FIG. 2, the outer surface of the piston body 80 adjacent the inner face 80A includes a plurality of notches or recesses 80D provided therein. Similarly, the piston body 80' is generally cylindrical and includes an inner face 80A', an outer face 80B', and an annular seal groove 80C' formed therein. The outer surface of the piston body 80' adjacent the inner face 80A' thereof also includes a plurality of notches or recesses (not shown) provided therein.

As illustrated in this embodiment, the piston insert 82 include a radially outwardly extending first flange 82A, and a radially outwardly extending second flange 82B. As best shown in FIG. 3, the first flange 82A defines a first flange outer diameter D1, the second flange 82B defines a second flange outer diameter D2, and the outer surface 80B of the piston body 80 defines a piston body outer diameter D3. In the illustrated embodiment, the first flange outer diameter D1 is greater than the second flange outer diameter D2, and the piston body outer diameter D3 is greater than the first flange outer diameter D1. Preferably, the first flange outer diameter D1 is in the range from around 50% to around 90% of the piston body outer diameter D3, and the second flange outer diameter is in the range from around 25% to around 75% of the piston body outer diameter D3. More preferably, the first flange outer diameter D1 is in the range from around 75% to around 90% of the piston body outer diameter D3, and the second flange outer diameter is in the range from around 45% to around 55% of the piston body outer diameter D3. As a result, the first flange 82A of the piston insert 82 functions as a primary pressure distribution means and is effective to distribute the pressure across an associated adjacent surface 80E of the piston body 80 during brake application. The second flange 82B of the piston insert 82 is effective to assist in securing the piston insert 82 to the piston body 80. Also, depending upon the particular application, the second flange 82B of the piston insert 82 can function as a secondary pressure distributions means to distribute the pressure across an associated adjacent surface 80F of the piston body 80 during brake application. Alternatively, one or more of the diameters D1, D2, and D3 can be other than illustrated if desired.

Similarly, the piston insert 82' includes a radially outwardly extending first flange 82A', and a radially outwardly extending second flange 82B'. The first flange 82A' defines a first flange outer diameter (not shown), and the second flange 82B' defines a second flange outer diameter (not shown) which is less than the first flange outer diameter. The first flange 82A' of the piston insert 82' functions as a primary pressure distribution means and is effective to distribute the pressure across an associated adjacent surface 80E' of the piston body 80' during brake application. The second flange 82B' of the piston insert 82' is effective to assist in securing the piston insert 82' to the piston body 80'. Also, depending upon the particular application, the second flange 82B' of the piston insert 82' can function as a secondary pressure distributions means to distribute the pressure across an associated adjacent surface 80F' of the piston body 80' during brake application.

The spring 78 is disposed in the wheel cylinder housing 62 between the inner end 80A of the piston body 80 and the inner end 80A' of the piston body 80'. Alternatively, the inner ends 80A and 80A' of the respective piston bodies 80 and 80' could be provided with a structure for receiving at least a portion of the associated ends of the spring 78. For example, the inner ends 80A and 80A' of the piston bodies 80 and 80' could be provided with generally cup-shaped recesses (not shown) for partially receiving the associated ends of the spring 78. The wheel cylinder 60 further includes a first pair of elastomeric boot seals 90 and 90', and a second pair of elastomeric annular fluid seals 92 and 92'. The boot seal 90 includes an first end 90A which is disposed about the first annular groove 64A of the body 62 of the wheel cylinder 60, and a second end 90B which is disposed about the boot groove 82C provided in the piston insert 82. The fluid seal 92 is disposed in an annular seal groove 80C provided in the piston body 80. Similarly, the boot seal 90' includes an first end 90A' which is disposed about the first annular groove 64A of the body 62 of the wheel cylinder 60, and a second end 90B' which is disposed about the boot groove 82C' provided in the piston insert 82'. The fluid seal 92' is disposed in an annular seal groove 80C' provided in the piston body 80'.

Figure 4:
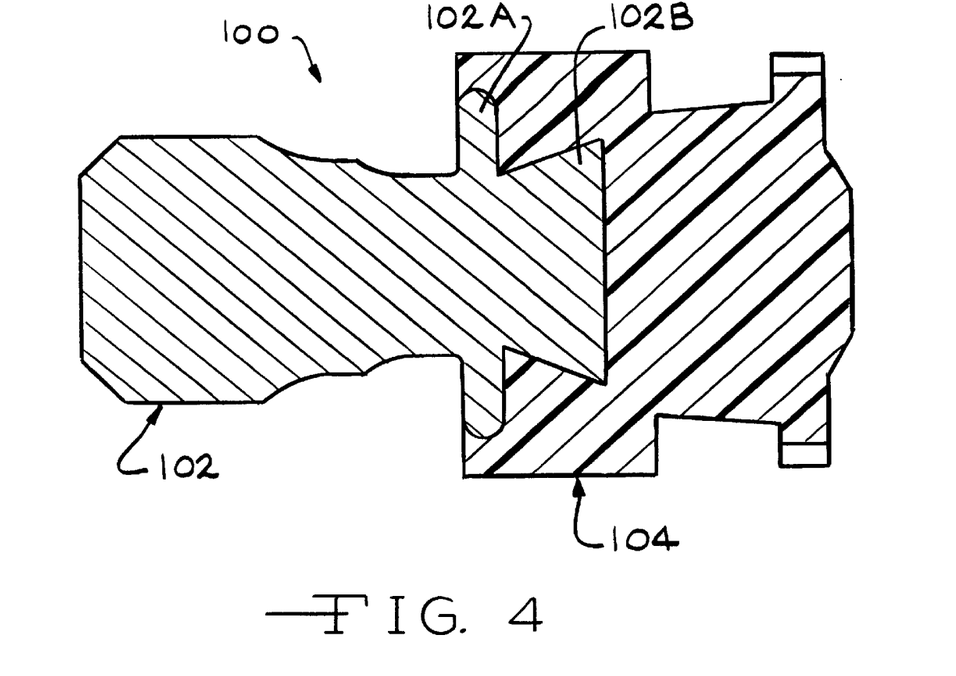
FIG. 4 is a sectional view of a portion of a second embodiment of a piston assembly adapted for use in a wheel cylinder in accordance with this invention.

FIG. 4 illustrates a second embodiment of a piston assembly, indicated generally at 100, in accordance with this invention. As shown therein, the piston assembly 100 includes a piston insert 102 and a piston body 104. In this embodiment, the piston insert 102 includes a radially outwardly extending flange 102A, and a tapered increasing diameter inner end portion 102B as opposed to the radially outwardly extending second flange 82B of the piston insert 82 described above in connection with FIGS. 1–3. The tapered inner end portion 102B of the piston insert 102 is operative to assist in securing the piston insert 102 to the piston body 104.

Figure 5:
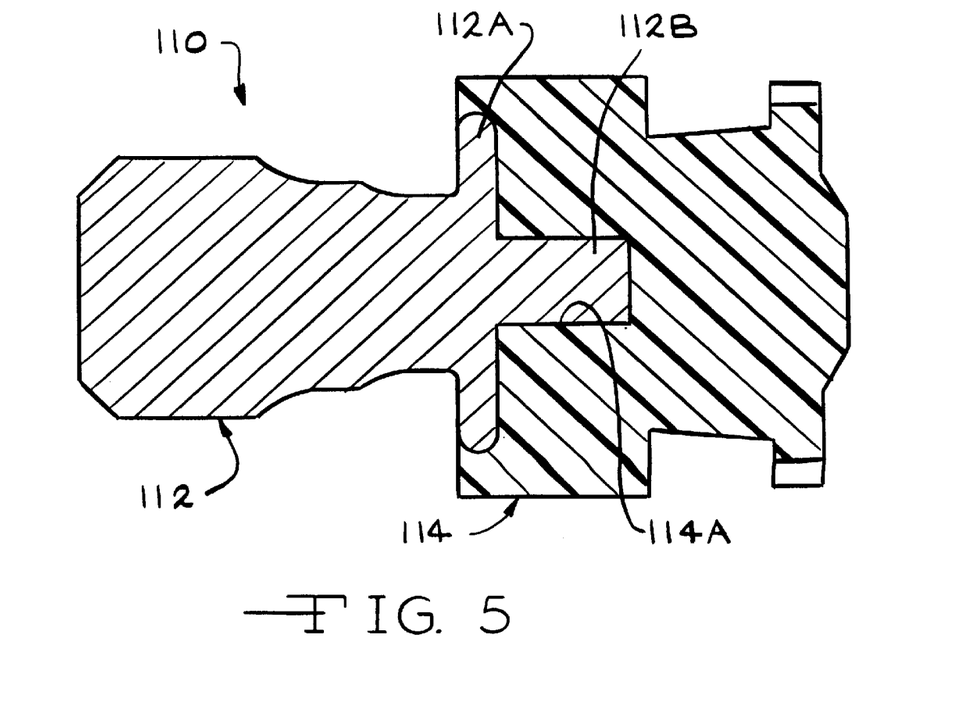
FIG. 5 is a sectional view of a portion of a third embodiment of a piston assembly adapted for use in a wheel cylinder in accordance with this invention.

FIG. 5 illustrates a third embodiment of a piston assembly, indicated generally at 110, in accordance this invention. As shown therein, the piston assembly 110 includes a piston insert 112 and a piston body 114. In this embodiment, the piston insert 112 includes a radially outwardly extending flange 112A, and a reduced diameter generally "smooth" inner end portion 112B as opposed to the radially outwardly extending second flange 82B of the piston insert 82 described above in connection with FIGS. 1–3. The inner end portion 112B of the piston insert 112 is operative to assist in securing the piston insert 112 to the piston body 114. While the piston insert 112 in this embodiment is preferably molded in situ with the piston body 114, the piston insert 112 could be press-fit into an opening 114A provided in the piston body 114 subsequent to the forming of the piston body 114. In this case, an adhesive or other type of permanent securing means could be used if desired to further assist in securing the piston insert 112 to the piston body 114. Also, in this case, the opening 114A in the piston body 114 is preferably an "as molded" opening. However, the opening 114A could be formed by other means, such as by drilling, for example.

Figure 6:
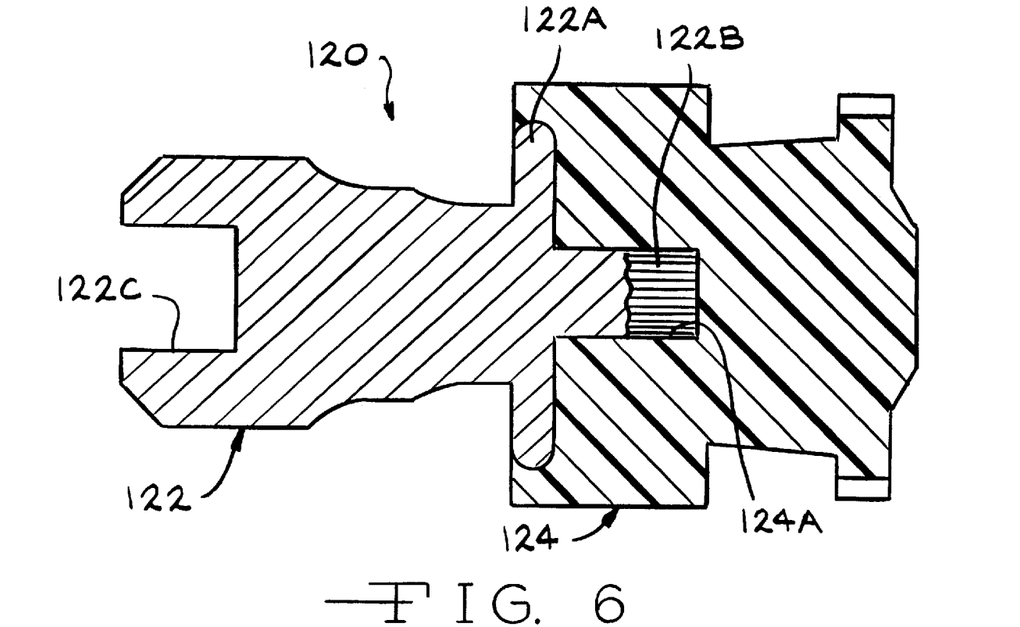
FIG. 6 is a sectional view of a portion of a fourth embodiment of a wheel cylinder piston constructed in accordance with this invention.

FIG. 6 illustrates a fourth embodiment of a piston assembly, indicated generally at 120, in accordance with this invention. The piston assembly 120 includes a piston insert 122 and a piston body 124. In this embodiment, the piston insert 122 includes a radially outwardly extending flange 122A, and a reduced diameter inner end portion 122B having a serrated, knurled, or other kind of non-smooth outer surface as opposed to the radially outwardly extending second flange 82B of the piston insert 82 described above in connection with FIGS. 1–3. The inner end portion 122B of the piston insert 122 is operative to assist in securing the piston insert 122 to the piston body 124. While the piston insert 122 in this embodiment is preferably molded in situ with the piston body 124, the piston insert 122 could be press-fit into an opening 124A provided in the piston body 124 subsequent to the forming of the piston body 124. In this case, an adhesive or other type of permanent securing means could used if desired to further assist in securing the piston insert 122 to the piston body 124. Also, in this case, the opening 124A in the piston body 124 is preferably an "as molded" opening. However, the opening 124A could be formed by other means, such as by drilling, for example. In addition, in the embodiment shown in FIG. 6, the piston insert 122 includes an outer end having a notch or recess 122C formed therein. As is known, the notch 122C is adapted to receive the web portion of a brake shoe.

Figure 7:
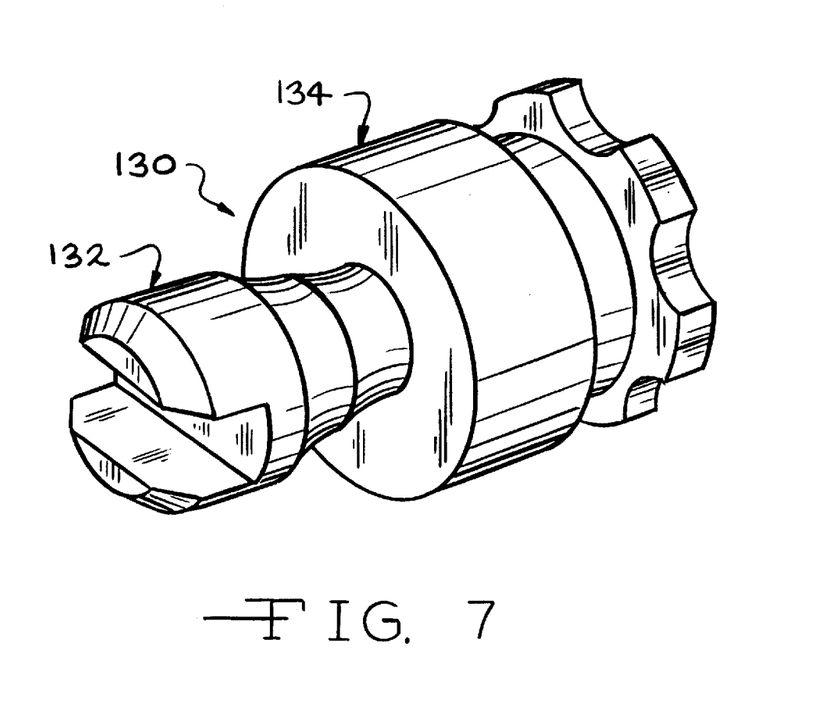
FIG. 7 is a perspective view of a portion of a fifth embodiment of a piston assembly adapted for use in a wheel cylinder in accordance with this invention.
Figure 8:
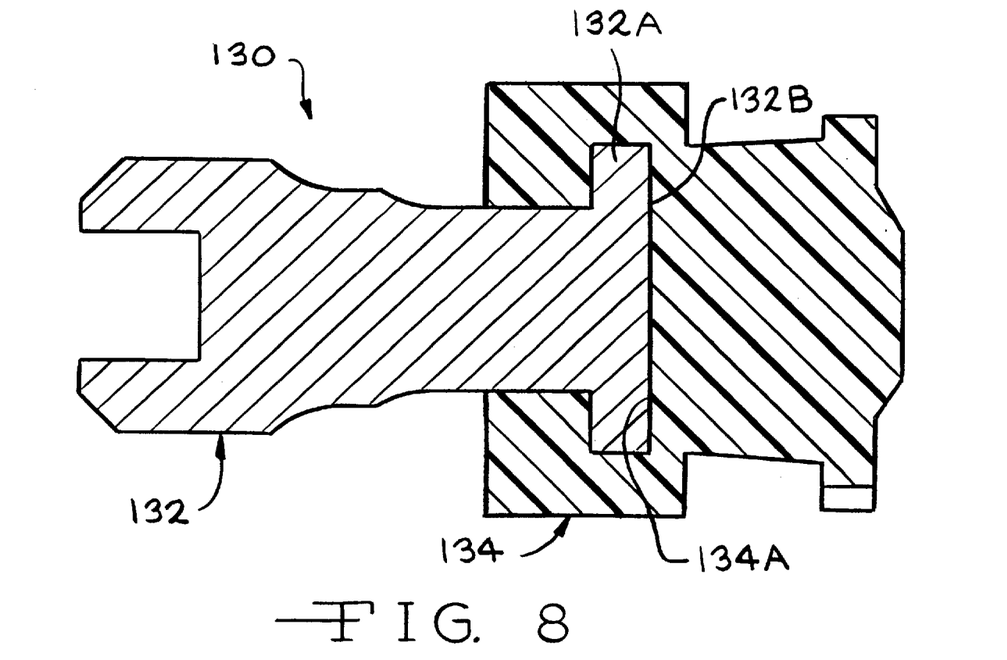
FIG. 8 is a sectional view of the piston assembly illustrated in FIG. 7.

FIGS. 7 and 8 illustrate a fifth embodiment of a piston assembly, indicated generally at 130, in accordance with this invention. The piston assembly 130 includes a piston insert 132 and a piston body 134. In this embodiment, the piston insert 132 includes only a single inner flange 132A, as opposed to the radially outwardly extending first and second flanges 82A and 82B of the piston insert 82 described above in connection with FIGS. 1–3. The inner flange 132A of the piston insert 132 is operative to assist in securing the piston insert 132 to the piston body 134, and an inner end face 132B of the flange 132A of the piston insert 132 is effective to distribute the pressure across an associated adjacent surface 134A of the piston body 134 during brake application.

Figure 9:
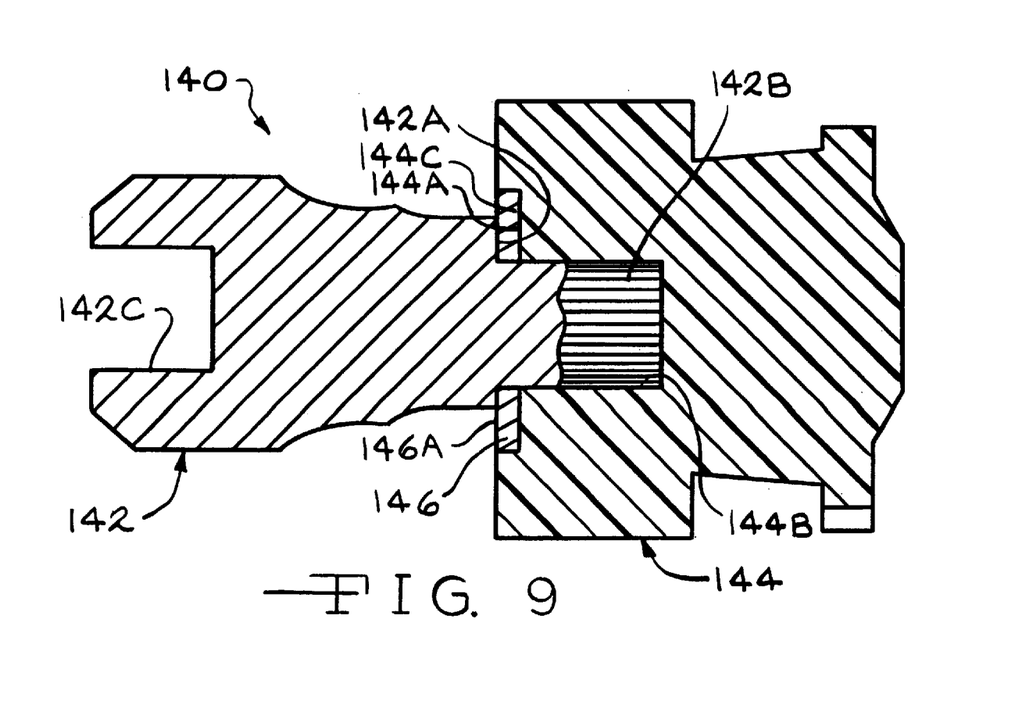
FIG. 9 is a sectional view of a portion of a sixth embodiment of a piston assembly adapted for use in a wheel cylinder in accordance with this invention.

FIG. 9 illustrates a sixth embodiment of a piston assembly, indicated generally at 140, in accordance with this invention. The piston assembly 140 includes a piston insert 142, a piston body 144, and a washer 146. In this embodiment, the piston insert 142 includes a radially outwardly extending piston insert shoulder 142A, and a reduced diameter inner end portion 142B having a serrated or knurled outer surface as opposed to the radially outwardly extending second flange 82B of the piston insert 82 described above in connection with FIGS. 1–3. The shoulder 142A of the piston insert 142 abuts an outer surface 146A of the washer 146, and the washer 146 is effective to distribute the pressure across an associated adjacent surface 144A of the piston body 144 during brake application. While the piston insert 142 and the washer 146 in this embodiment are preferably molded in situ with the piston body 144, the inner end portion 142B of the piston insert 142 could be press-fit into an opening 144B provided in the piston body 144 subsequent to the forming of the piston body 144, and/or the washer 146 could be press-fit into an recessed opening 144C provided in the piston body 144 subsequent to the forming of the piston body 144. In this case, an adhesive or other type of permanent securing means could be used if desired to further assist in securing the piston insert 142 and/or the washer 146 to the piston body 144. Also, in this case, one or both of the openings 144B and 144C in the piston body 144 are preferably "as molded" openings. However, the opening 144B and/or the opening 144C A could be formed by other means, such as by drilling, for example. In addition, in the embodiment shown in FIG. 9, the piston insert 142 includes an outer end having a notch or recess 142C formed therein.

Figure 10:
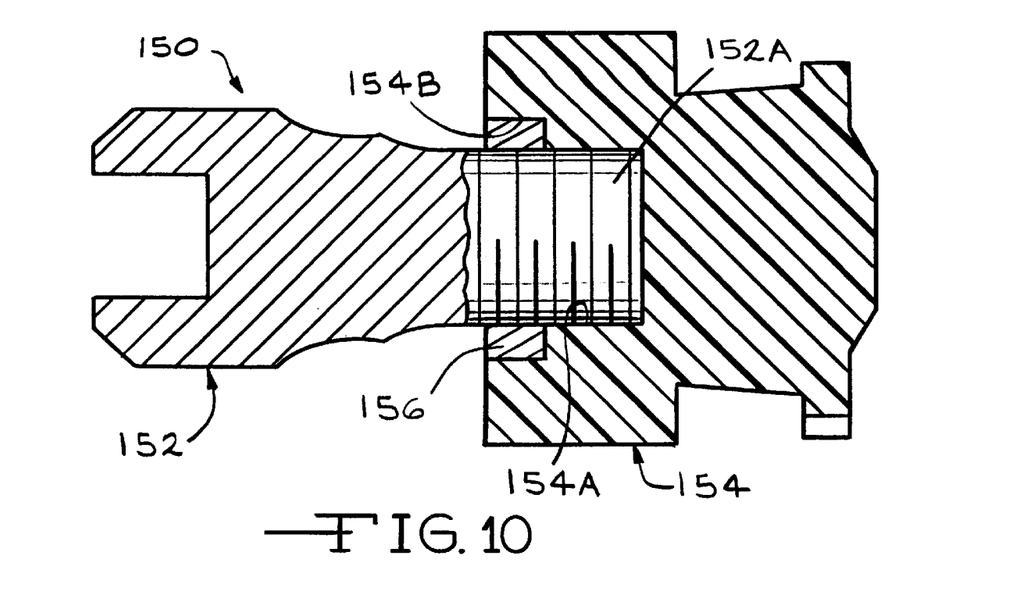
FIG. 10 is a sectional view of a portion of a seventh embodiment of a piston assembly adapted for use in a wheel cylinder in accordance with this invention.
Figure 11:
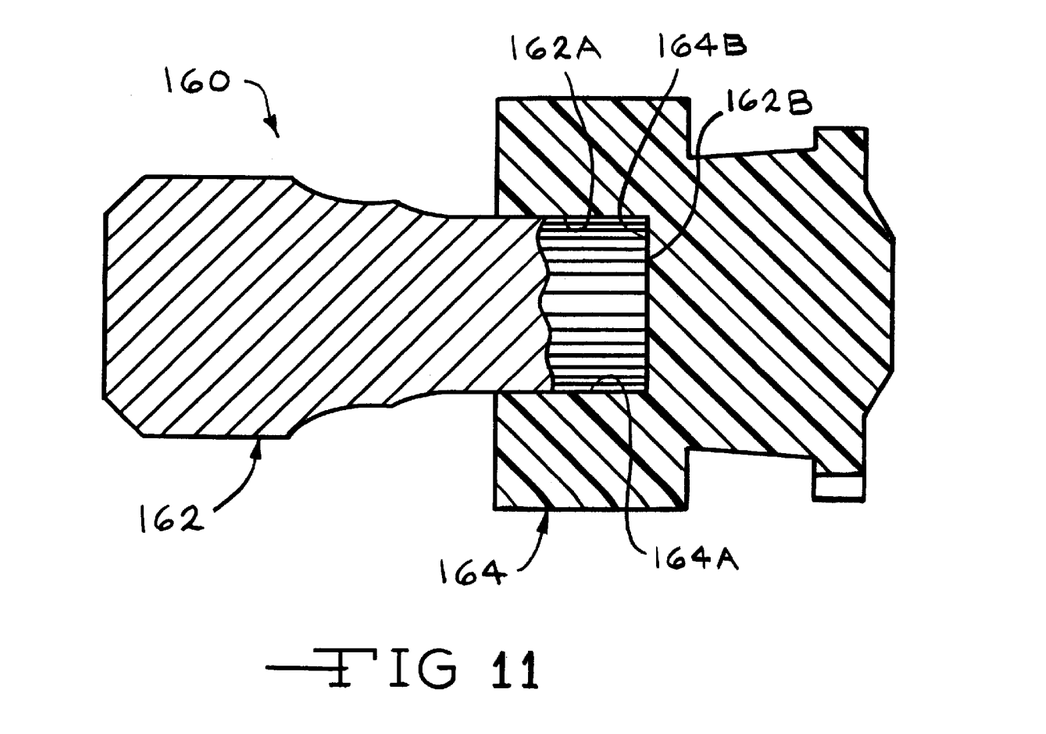
FIG. 11 is a sectional view of a portion of an eighth embodiment of a piston assembly adapted for use in a wheel cylinder in accordance with this invention.

FIG. 10 illustrates a seventh embodiment of a piston assembly, indicated generally at 150, in accordance with this invention. The piston assembly 150 includes a piston insert 152, a piston body 154, and a threaded nut 156. In this embodiment, the piston insert 152 includes an externally threaded inner end portion 152A which is threadably received in the internal threads of the nut 156. While the nut 156 in this embodiment is preferably molded in situ with the piston body 154 and a plug (not shown) is used to produce an as molded opening 154A in the piston body 154 for receiving the inner end portion 152A of the piston insert 152, the nut 156 could be press-fit into a recessed opening 154B provided in the piston body 14 subsequent to the forming of the piston body 144, and/or the opening 154A could produced in the piston body 154 subsequent to the forming of the piston body 154. In this case, an adhesive or other type of permanent securing means could be used if desired to further assist in securing the nut 156 to the piston body 154. Also, the nut 156 or a flat ring/washer (not shown but could be similar to the washer 146 shown in FIG. 9), could first be installed on the piston insert 152, and then the piston insert and nut/washer assembly could then be molded in situ with the piston body 154.

FIG. 1 illustrates an eight embodiment of a piston assembly, indicated generally at 160, in accordance with this invention. The piston assembly 160 includes a piston insert 162 and a piston body 164. In this embodiment, the piston insert 162 includes only a reduced diameter inner end portion 162A having a serrated, knurled, or other kind of non-smooth outer surface as opposed to the radially outwardly extending first and second flange 82A and 82B of the piston insert 82 described above in connection with FIGS. 1–3. The inner end portion 162A of the piston insert 162 is operative to assist in securing the piston insert 162 to the piston body 164, and an inner end face 162B of the piston insert 162 is effective to distribute the pressure across an associated adjacent surface 164B of the piston body 164 during brake application. While the piston insert 162 in this embodiment is preferably molded in situ with the piston body 164, the piston insert 162 could be press-fit into an opening 164A provided in the piston body 164 subsequent to the forming of the piston body 164. In this case, an adhesive or other type of permanent securing means could used if desired to further assist in securing the piston insert 162 to the piston body 164. Also, in this case, the opening 164A in the piston body 164 is preferably an "as molded" opening. However, the opening 164A could be formed by other means, such as by drilling, for example. Also, depending upon the particular application, the knurled outer surface portion of the piston insert 162 could also be effective to distribute pressure across the associated adjacent surface of the opening 164A of the piston body 164 during brake application.

Although this invention has been described and illustrated in connection with a particular prior art drum brake assembly 10 illustrated in FIG. 12, it will be appreciated that this invention may be used in connection with other drum brake assemblies. For example, this invention may be used in a "duo-servo" type of drum brake assembly, in a "dual mode" drum brake assembly, wherein the service brake is of the leading/trailing type and the parking and emergency brake is of the duo-servo type. Some examples of the above brake assemblies are shown in U.S. Pat. No. 5,070,968 to Evans, and U.S. Pat. No. 5,275,260 to Evans et al., the disclosures of which are incorporated herein.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A piston assembly adapted for use in a wheel cylinder of a drum brake assembly having a pair of brake shoes which arc urged into frictional engagement with a brake drum comprising:

a piston body formed from a plastic material and defining an axis, said piston body including an inner face, an outer face, and a stepped opening formed in said outer face and extending toward said inner face, said stepped opening including a first opening and a second opening, said first opening defining a first opening dimension and said second opening defining a second opening dimension less than said first opening dimension, said first opening disposed adjacent said outer face and said second opening disposed between said first opening and said inner face; and a piston insert formed from a non-plastic material, said piston insert including an outer end adapted to engage a brake shoe of the drum brake assembly and an opposite inner end extending into said piston body, said inner end of said piston insert including a first section and a second section, said first section including a first radially outwardly extending flange disposed in said first opening of said piston body to provide a pressure distributing means which is operative to distribute pressure across an associated adjacent surface of said piston body directly adjacent said outer face thereof, wherein said second section of said inner end of said piston insert is generally tapered and said second section including means for securing said inner end of said piston insert to said piston body.

2. The piston assembly according to claim 1 wherein said piston insert is integrally molded in situ with said piston body.

3. The piston assembly according to claim 1 wherein said piston body is molded from a plastic material and said piston insert is formed from a metal and is integrally molded in situ therewith.

4. The piston assembly according to claim 1 wherein said piston body includes an outer surface which defines a piston body outer diameter, said flange of said piston insert defines a piston insert outer diameter, said piston insert outer diameter in the range from around 50% to around 90% of said piston body outer diameter.

5. The piston assembly according to claim 1 wherein said second section of said inner end of said piston insert is generally smooth.

6. The piston assembly according to claim 1 wherein said piston insert is formed from a metal material.

7. The piston assembly according to claim 1 wherein said outer end of said piston insert includes a recess formed therein, said recess adapted to receive a web portion of the brake shoe of the drum brake assembly.

* * * * *